United States Patent [19]

Kleeberg et al.

[11] 4,013,455
[45] Mar. 22, 1977

[54] METHOD OF AND APPARATUS FOR TREATING A NONFERROUS METAL

[75] Inventors: Ulrich Kleeberg, Mulheim; Jurgen Leimkuhler, Essen, both of Germany

[73] Assignee: Gottfried Bischoff Bau kompl., Essen, Germany

[22] Filed: Feb. 14, 1975

[21] Appl. No.: 550,016

[30] Foreign Application Priority Data

Feb. 21, 1974 Germany .................. 2408222

[52] U.S. Cl. .................. 75/68 R; 23/262; 55/84; 55/226; 55/228; 75/62; 261/DIG. 9; 266/147; 423/240

[51] Int. Cl.² .................. C22B 21/00

[58] Field of Search ............ 55/84, 85, 89, 83, 226, 55/228; 261/17, DIG. 9; 23/262, 277 C; 48/111, 209; 423/240; 266/147; 75/62, 68 A

[56] References Cited

UNITED STATES PATENTS

| | | | |
|---|---|---|---|
| 2,677,439 | 5/1954 | Hedberg | 55/85 X |
| 2,835,562 | 5/1958 | Boyer et al. | 55/85 X |
| 3,502,441 | 3/1970 | Hudson | 55/83 X |
| 3,518,812 | 7/1970 | Kolm | 55/89 X |
| 3,619,983 | 11/1971 | Rohr | 55/89 |
| 3,695,004 | 10/1972 | DeLisio et al. | 55/226 X |
| 3,704,570 | 12/1972 | Gardenier | 55/84 |
| 3,726,065 | 4/1973 | Hausberg et al. | 55/226 X |
| 3,820,307 | 6/1974 | Haugsberg et al. | 55/226 |

*Primary Examiner*—Frank W. Lutter
*Assistant Examiner*—William A. Cuchlinski
*Attorney, Agent, or Firm*—Karl F. Ross; Herbert Dubno

[57] ABSTRACT

A nonferrous metal is heated so as to produce a hot gas that is passed through an evaporative-cooler and, without saturation of the gas, is introduced into a dry-process filter where particulate material is removed. Thereafter this gas is fed to a scrubbing tower whose scrubbing liquid removes gaseous, liquid, and any remaining particulate material from the gas and exits from the tower as a scrubbing liquor. This liquor is clarified and the decantate is recirculated for use as the scrubbing liquid while the sludge is neutralized and sent back to the evaporative cooler. The neutralized sludge is flash evaporated in the evaporative cooler so as to form crystals that are removed from the system either in this cooler or at the dry filter downstream therefrom. A particle filter may be provided between the neutralizer and the evaporative cooler to remove any hard particulate material from the neutralized sludge.

7 Claims, 1 Drawing Figure

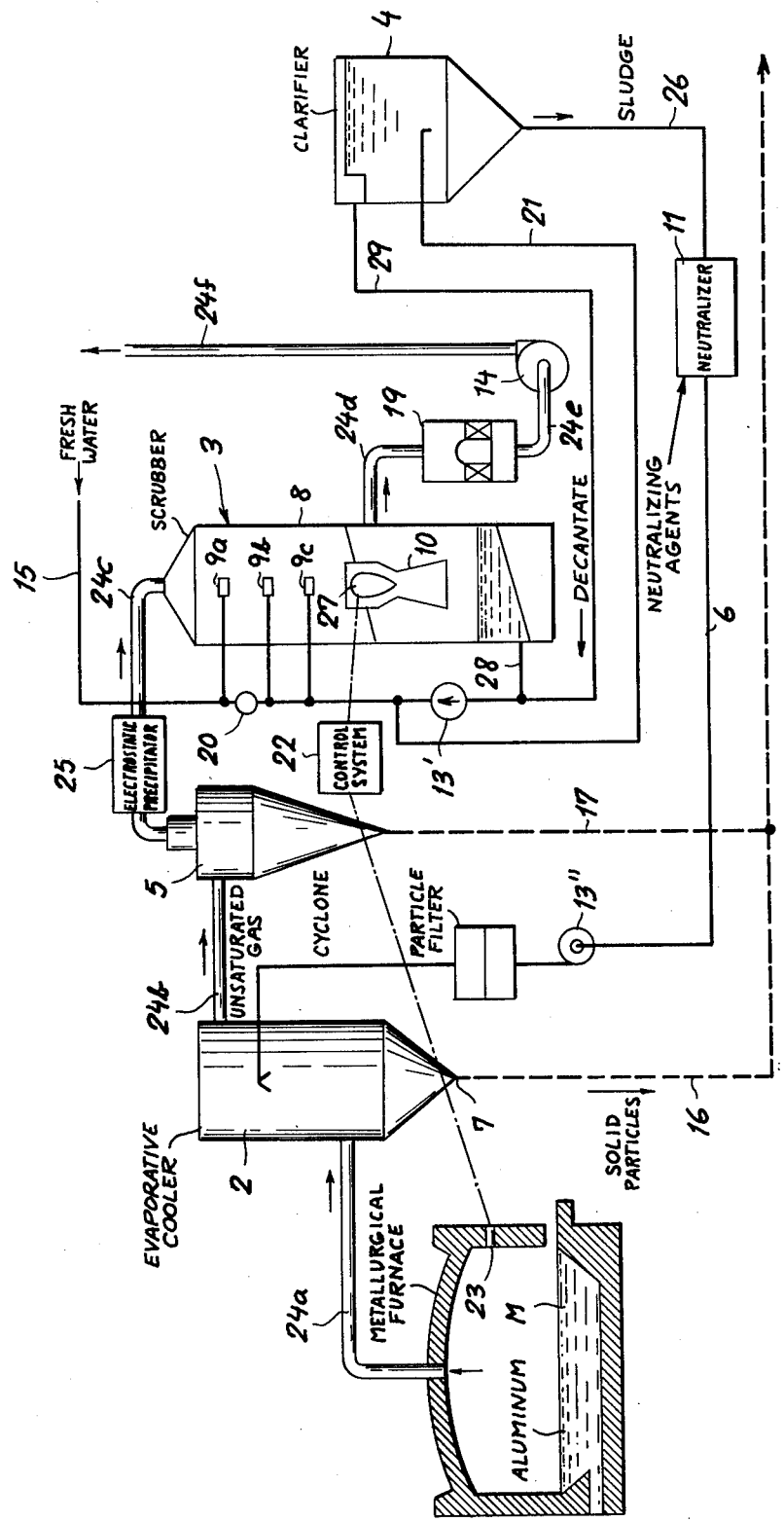

METHOD OF AND APPARATUS FOR TREATING A NONFERROUS METAL

FIELD OF THE INVENTION

The present invention relates to a method of and an apparatus for treating a nonferrous metal. More particularly this invention concerns the treatment of a nonferrous metal in a metallurgical furnace and the decontamination of gases produced by such treatment.

BACKGROUND OF THE INVENTION

The gases created by the treatment of a nonferrous metal in a metallurgical furnace are usually decontaminated simply by scrubbing them in a conventional scrubbing tower. The scrubbing liquid in this tower picks up the impurities in the gases and forms a liquor that is clarified into a decantate and a sediment or sludge. The sediment of sludge is disposed of and the decantate is recirculated as the scrubbing liquid.

Particular problems are present, however, in the metallurgical treatment of nonferrous metals. In particular the gases produced by such systems frequently contain impurities which go into solution in the scrubbing liquid. As the scrubbing liquid is evaporated in the tower and supplemented with fresh water, and as the sludge is drawn away from the scrubbing liquid the the acidity thereof tends to increase considerably. Beyond a certain acidity the scrubbing liquid becomes very dangerous and must be disposed of. This is a particular problem where free chlorine gas, as a result of using potassium chloride, sodium chloride and the like in the metallurgical furnace, is present in the gas.

Not only is it difficult to handle the scrubbing liquid and is its efficiency as a scrubbing liquid greatly reduced, but even if neutralized by addition thereto of calcium carbonate or sodium hydroxide one is left with a liquid that is still a pollutant that cannot be disposed of readily.

OBJECTS OF THE INVENTION

It is therefore an object of the present invention to provide an improved method of and apparatus for treating a nonferrous metal in a metallurgical furnace.

Another object is the provision of such a method wherein the gases produced are decontaminated and the above-given difficulties involving handling and disposal of the scrubbing liquor are obviated.

SUMMARY OF THE INVENTION

These objects are obtained according to the present invention in an arrangement wherein the nonferrous metal is treated in a metallurgical furnace so as to generate an impurity-carrying gas. This gas is first passed through an evaporative cooler, then through a dry-process separator, such as an electrostatic precipitator or cyclone and then through a scrubber as described above. The liquor produced by the scrubber is clarified so as to produce a decantate and a sludge, the decantate being recirculated as the scrubbing liquid and the sludge being fed in accordance with this invention to a neutralizer. The neutralized sludge is then fed, still in liquid form, back to the cooler which is advantageously of the evaporative-cooler type, where it is injected into the gas stream. This causes the neutralized sludge to be flash evaporated so that the impurities dissolved therein, which are the result of the neutralization of the acid content of the output of the scrubber, are carried by the gas stream as dry crystals to the dry-process separator where they are removed from the gas stream.

The system according to the present invention therefore allows for the effective neutralization of the impure and toxic fraction of the output liquid of the scrubber and allows the neutralized impurities to be recovered readily as dry crystals. It is even possible in accordance with this invention to use a neutralizing agent such as calcium oxide (CaO) in a system wherein chlorine ($Cl_2$) or hydrochloric (HCl) acid is present in the scrubber output. This combination allows calcium chloride ($CaCl_2$) to be recovered by the dry separator, this substance being of industrial value, as for instance a drying agent.

In accordance with this invention the evaporative cooler at the upstream end of the gas-decontaminating system is operated above the dewpoint of the gas, that is without saturation of this gas. Thus a humid but dry gas passes through the dry-process filter, this gas only becoming saturated in the scrubber.

DESCRIPTION OF THE DRAWING

The above and other objects, features, and advantages of the invention will become more readily apparent from the following description, reference being made to the accompanying drawing whose sole FIGURE is a flow diagram illustrating the method and system according to this invention.

SPECIFIC DESCRIPTION

As shown in the drawing a melt M of aluminum in a metallurgical furnace 1 is heated so as to develop gases which exit from the furnace 1 via a conduit section 24a. These hot gases are introduced into the bottom of an evaporative cooler 2 from the top of which extends another conduit section 24b through which still unsaturated gas passes out to a cyclone 5. In this cyclone 5 dry particles are removed, being carried away via a conduit 17.

The outlet of the cyclone 5 is connected to a conduit section 24c in which may be provided an electrostatic precipitator 25, and which leads to the top of a scrubber 3 comprising a tower 8 provided with three vertical spaced spray heads 9a–c. The upper head 9a is continuously supplied with fresh water from a line 15.

The outlet side of the tower 8 is provided with a restriction 10 of frustoconical shape in which is provided a tapered valve body 27 which is vertically displaceable by a control system 22, the body 27 and the restriction forming an annular gap washer. A pressure sensor 23 inside the furnace 1 insures that a proper back pressure is provided in conduit system 24a–c for most efficient operation of the furnace 1.

The scrubbed gases exit from the scrubbing tower 8 via a conduit 24d and pass into a droplet separator 19. Thereafter the gases exit from the separator 19 via a conduit section 24e and passes into the axial input of squirrel-cage blower 14 whence they are expelled into the atmosphere via a chimney 24f.

The scrubbing liquor in the bottom of the tower 8, underneath the restriction 10, is fed via a conduit 28, a pump 13', and a conduit 21 to a clarifier 4, as well as to the lower spray heads 9c and 9d. In addition the inlet side of the pump 13' is connected via a line 29 to the top of the clarifier 4 so as to draw decantate therefrom and feed it to the heads 9b and 9c.

A valve 20 is provided between the fresh-water inlet line 15 and the output side of the pump 13 so that, when this pump 13 is shut down the entire system can be flushed out with fresh water.

Sludge from the bottom of the clarifier 4 is fed via a pipe 26 to a neutralizer 11 where neutralizing agents such as lye (NaOH), calcium oxide (CaO), or calcium carbonate ($CaCO_3$) are added thereto. The thus neutralized sludge is then fed via a pipe 16 and a pump 13" through a particle filter 12 back to the evaporative cooler 2. In the cooler 2 the sludge operates as the cooling liquid and is flash evaporated. Solid particles, usually salt crystals, can be drawn off from the lower end 7 of the cooler 2 by means of a pipe 16 connected with the pipe 17 to an outlet conduit 18.

The apparatus functions as follows:

The hot gas exiting from the furnace 1 is cooled in the cooler 2 and most of the solid particles are stripped from the gas in the cyclone 5 and precipitator 25, although either of these dry-process separator 5 and 25 can be dispensed with. Then the gas is scrubbed in the tower 8, becoming saturated with fresh water and recycled decantate from the clarifier 4.

The scrubbing liquor issuing from the bottom of the tower 8 at the outlet pipe 28 is, as described above, separated into a decantate and sludge. The neutralized sludge is used as the cooling liquid in the evaporative cooler where it is flash evaporated. When thus evaporated it forms crystals which are either taken off via the pipe 16 or separated out via the cyclone 5 and removed by the pipe 17. In this manner it is possible fully to decontaminate the liquid issuing from the bottom of the tower 8, while at the same time allowing only particle-free and nonpolluting humid gas to exit from the extreme downstream section 24f of the conduit 24a–f.

We claim:

1. A method of treating a nonferrous metal comprising the steps of:
   heating a nonferrous metal in a metallurgical furnace to melt said metal and produce a hot impurity-bearing gas;
   evaporatively cooling said gas with a cooling liquid;
   thereafter separating particles from said gas in a dry process;
   maintaining said gas above its dewpoint during evaporative cooling of said gas and particle separation therefrom;
   thereafter contacting said gas with a scrubbing liquid to scrub said gas and produce a scrubbing liquor;
   clarifying said liquor to produce a decantate and a sludge;
   recirculating said decantate for use as scrubbing liquid;
   neutralizing said sludge; and
   recirculating the neutralized sludge and using same as at least part of said cooling liquid, whereby impurities in said gas are dissolved in said scrubbing liquid and separated out as crystals during the dry particle separation step.

2. The method defined in claim 1, further comprising the step of maintaining said gas above its dewpoint during evaporative cooling of said gas and particle separation therefrom.

3. An apparatus for treating a nonferrous metal comprising:
   a metallurgical furnace for melting a nonferrous metal and producing a hot gas;
   a conduit defining a flow path for said gas;
   means in said conduit for evaporatively cooling said gas with a cooling liquid;
   dry separator means downstream of the evaporative cooling means of said conduit for separating particles from said gas in a dry process;
   scrubbing means including an annular gap washer downstream of said filter means in said conduit for contacting said gas with a scrubbing liquid for scrubbing said gas and producing a scrubbing liquor;
   clarifying means connected to said scrubbing means for reducing said liquor to a decantate and a sludge;
   means for feeding said decantate into said scrubbing means as said scrubbing liquid;
   means connected to said clarifying means for neutralizing said sludge; and
   means connected to the neutralizing means for feeding the neutralized sludge back to said evaporative-cooler means as at least part of said cooling liquid.

4. The apparatus defined in claim 3 wherein said dry separator means is a cyclone.

5. The apparatus defined in claim 3 wherein said dry separator means is an electrostatic precipitator.

6. The apparatus defined in claim 3 wherein said scrubbing means is a scrubbing tower having an outlet side provided with said annular gap washer.

7. The apparatus defined in claim 3, further comprising particle-filter means between said evaporative-cooler means and said neutralizing means for removing particulate material from said neutralized sludge.

* * * * *